United States Patent [19]

Roycraft et al.

[11] 3,749,843

[45] July 31, 1973

[54] DIGITAL AMPLITUDE MODULATOR

[75] Inventors: Theodore James Roycraft, Morristown; John Robert Sheehan, Red Bank, both of N.J.

[73] Assignee: Bell Telephone Laboratories, Incorporated, Murray Hill, Berkeley Heights, N.J.

[22] Filed: May 8, 1972

[21] Appl. No.: 251,254

[52] U.S. Cl. ............... 179/15 A, 307/264, 332/9 R, 332/11.0

[51] Int. Cl. ............... H04j 3/04

[58] Field of Search ............... 178/67, 66 R; 179/15 FO, 15 A; 307/264, 229; 332/9 R, 11.0, 31 R, 31 T

[56] References Cited

UNITED STATES PATENTS

| | | | |
|---|---|---|---|
| 3,128,343 | 4/1964 | Baker | 178/66 R |
| 3,659,053 | 4/1972 | Low | 179/15 FD |
| 3,619,503 | 11/1971 | Ragsdale | 178/67 |
| 3,602,741 | 8/1971 | Ressler | 307/264 |
| 3,539,835 | 11/1970 | Hinze | 307/264 |

*Primary Examiner*—Kathleen H. Claffy
*Assistant Examiner*—David L. Stewart
*Attorney*—W. L. Keefauver

[57] ABSTRACT

An envelope modulator which shapes and combines a number of binary input signals by digital means comprises a compact combinatorial logic network, a digital-to-analog converter and a low-pass filter. The logic network operates on the binary input signals to provide at its output a plurality of binary coded bit streams representing a quantized composite of the input signals with a superimposed desired amplitude shaping. The digital-to-analog converter combines the bit streams from the logic network into a quantized signal and the low-pass filter yields a smooth line signal suitable for transmission over bandlimited channels. The elimination of the reactive components required in conventional analog envelope modulators makes this invention capable of operation over a wide range of baud rates.

8 Claims, 5 Drawing Figures

DIGITAL AMPLITUDE MODULATOR

FIELD OF THE INVENTION

This invention relates generally to amplitude modulators and in particular to time domain pulse shaping by digital means.

BACKGROUND OF THE INVENTION

It is a common practice in digital transmission systems to impart nonlinear shaping to the transmitted pulses. In this manner unwanted frequency components, which contribute to spectral overlap and a high out-of-band energy density, are attenuated. This results in the conservation of spectral bandwidth. Another technique often used to conserve bandwidth is the time division multiplexing or interleaving of bits from a plurality of sources. The present invention is directed to the simultaneous performance of both these functions.

An example of a system where both of the aforementioned functions are performed is the phase-modulated transmitter disclosed in U. S. Pat. No. 3,128,342, issued on Apr. 7, 1964 to P. A. Baker. Baker's transmitter produces a sine-wave carrier whose phase is changed by discrete 45° multiples every T seconds in accordance with the value of successive pairs (dibits) of digits in a 2/T bit per second binary input signal. Because only four phase changes are possible, they are necessarily abrupt. Thus, an envelope modulator is provided to smooth these phase transitions. Envelope modulation is facilitated by directing odd- and even-ordered phase-shifted signals to separate channels, whose envelopes can be independently shaped. Effectively, amplitudes in each channel are suppressed during phase changes and enhanced under steady-state conditions.

The separate channel signals are readily combined or interleaved without interference to form the desired output signal. Baker achieves the shaping and interleaving functions by analog means which exhibit a strong dependence on component values and a substantial variation of performance with component aging. Furthermore, the use of fixed reactive components limits Baker's envelope modulator to a single baud rate.

It is an object of this invention to eliminate substantially the dependence on component values of the output of an envelope modulator in a synchronous data transmission system.

It is a further object of this invention to enable an envelope modulator in a synchronous data transmission system to operate with a range of baud rates.

It is another object of this invention to reduce the size and cost of envelope modulators employed in data transmission systems.

SUMMARY OF THE INVENTION

According to this invention, a plurality of binary data signals are combined by digital means into a composite channel signal having a preassigned amplitude-shaping function. The several input signals are simultaneously applied to different input channels, to each of which is assigned a repetitive sequence of discrete weights, corresponding to a quantization of the desired amplitude-shaping function. The instantaneous condition of an individual input signal determines the instantaneous polarity, positive for logical 1 and negative for logical 0, of the particular weight to be associated with its input channel at that instant. Responsive to the input signals taken as a group, a logic circuit generates a plurality of parallel binary signals uniquely coded to represent the algebraic sum of the polarized weights. By conventional means, the parallel signals are converted into analog form to yield a bipolar interleaving of the several input signals with the desired envelope superimposed. After low-pass filtering, the shaped signal is suitable for transmission over band-limited facilities, such as the telephone network.

Expressed in more concrete terms, this invention comprises apparatus whose output at any instant in time is the algebraic sum of preassigned weights. The instantaneous assigned weight for each channel is added or subtracted depending on whether the signal on that channel is in the logical 1 or logical 0 condition.

In an illustrative embodiment of this invention, two binary input signals of the type resulting from phase encoding of alternate dibit pairs of data signals, as taught in the aforementioned Baker patent, on substantially constant-frequency carrier waves are keyed at 2T-second alternate baud intervals and applied to a logic network having 32 output states coded on five parallel bit streams. The sequences of weights for the two input channels are advantageously selected to correspond approximately to 16 equally spaced samples of a modified raised cosine amplitude-shaping function. Individual weights are resolved to 16 levels. Thus, since these weights may have either a positive or negative polarity, as determined by the instantaneous values of their respective inputs, the sum of the polarized weighting functions can have 32 possible values. Each of the output states of the logic network corresponds to one of the values of the polarized sum.

It is a feature of this invention that the shaping function is programmed into the logic network and no special generators or memories are required as in analog modulators. Thus, the nature of the shaping function can readily be changed from one arbitrary form, such as the modified raised-cosine form, to any other by simple wiring rearrangements within the logic network.

DESCRIPTION OF THE DRAWING

The above and other objects and features of this invention will be realized from a consideration of the following detailed description and the drawing in which.

DETAILED DESCRIPTION

Figure 1:
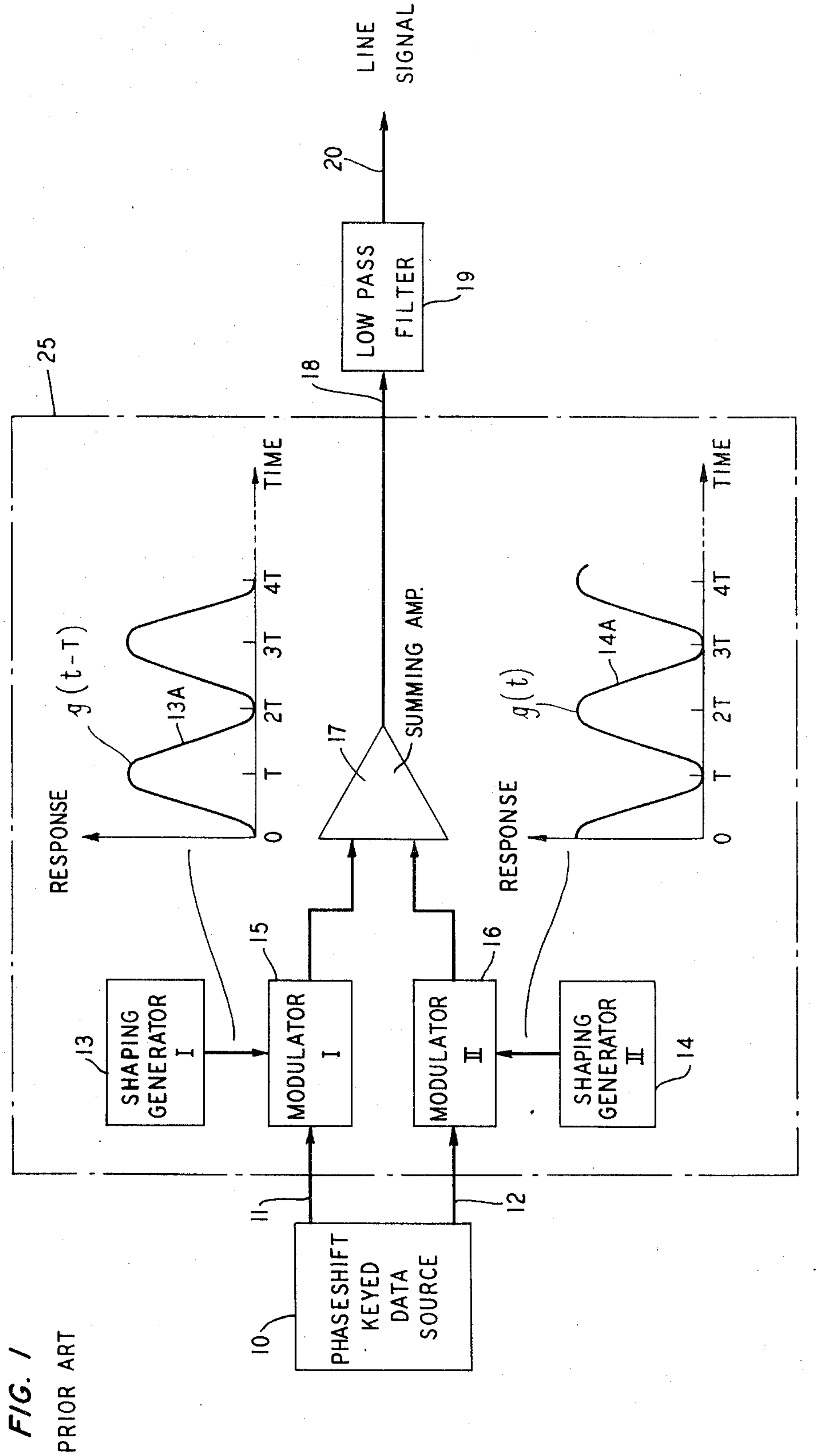
FIG. 1 PRIOR ART
FIG. 1 is a simplified block diagram of the analog envelope modulator taught by the aforementioned Baker patent.

A simplified version of the prior art method of envelope modulation described in detail in the aforementioned Baker patent is illustrated in FIG. 1. Data source 10 includes all the apparatus required to create two binary phase-shift keyed signals from a stream of 2/T binary digits (bits) per second. It should be noted that the interval between phase changes in either of the signals is 2T seconds and that phase changes never occur in both channels simultaneously, but rather occur at T-second intervals in alternate channels. As a result, one signal maintains constant phase while the other is changing phase. These signals appear on lines 11 (channel A) and 12 (channel B) in squared-up form. Shaping generators 13 and 14 produce the two raised-cosine shaping signals $g(t\text{-T})$, diagrammed as smooth curve 13A and $g(t)$, diagrammed as smooth curve 14A each with period 2T. These signals are identical except for a relative phase shift of 180°. Their minima occur during the phase changes of the corresponding channel and their maxima between such phase changes. Modulator 15 uses the signal from shaping generator 13 to modulate the signal on line 11 and modulator 16 uses the signal from shaping generator 14 to modulate the signal on line 12. The two modulator outputs are then combined in summing amplifier 17 to yield on line 18 an interleaved and envelope-modulated signal with a T-second baud interval. Low-pass filter 19 smooths this signal. Line 20 now has a constant-frequency signal wave whose phase changes by discrete amounts at the rate of 1/T per second with appropriate pulse shape and gradual phase transitions. All the essential elements of the prior-art envelope modulator are included within the dashed region 25.

Figure 2:
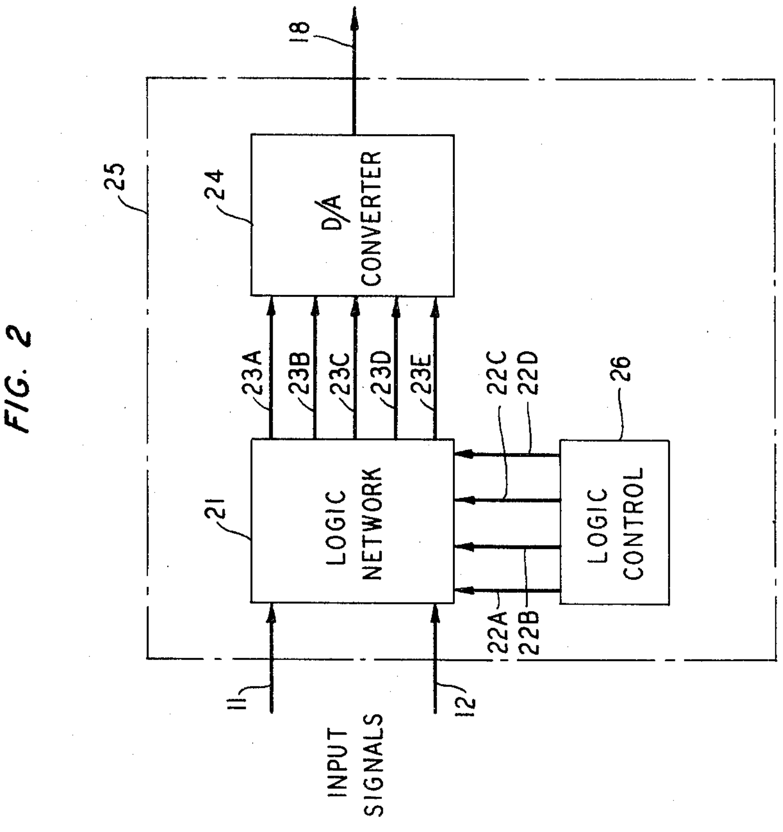
FIG. 2 is a block diagram of a digital envelope modulator according to this invention.

The block diagram of FIG. 2 is an illustrative embodiment of the invention with replaces dashed-line block 25 in FIG. 1. Two phase-shift keyed binary signals are applied on input lines 11 (channel A) and 12 (channel B) to logic network 21. Logic control 26 provides control signals to logic network 21 on lines 22A, 22B, 22C and 22D. These control signals comprise synchronized square waves appearing on the respective lines at frequencies of 0.5/T, 1/T, 2/T and 4/T cycles per second; the signals are hereinafter designated for analytical purposes M, N, P and Q, respectively. Logic control 26 is conveniently synchronized with the keying clock implicit in data source 10. In a practical case, all the required frequencies may be derived from the data source.

Phase changes in the signals on lines 11 and 12 occur in synchronism with, but during alternate half cycles of, the keying clock which has the same frequency as M. The instantaneous values of the signals M, N, P and Q collectively define a sequence of 16 discrete control states. During each dibit pair interval of 2T seconds duration, all these states occur in repetitive sequence, thereby defining 16 subintervals. During each subinterval, a separate weight is assigned to each of channels A and B. The instantaneous value of the signal on channel A or B determines whether the weight assigned to that channel at a particular instant is to have a positive or negative polarity. The binary output signals on lines 23A through 23E encode the polarized sum of the weights. Thus, the interaction in logic network 21 of control signals from logic control 26 with data signals on input leads 11 and 12 generates a plurality of binary bit streams on lines 23A through 23E which together encode a quantized composite of the input data signals with a superimposed envelope.

The bit streams on leads 23A through 23E are applied to digital-to-analog converter 24, which produces a bipolar quantized version of the weighted sum of the input data signals on lead 18. As in FIG. 1, a low-pass filter 19 smooths this quantized signal to produce a shaped, interleaved combination of the two input signals on line 20.

Figure 3:
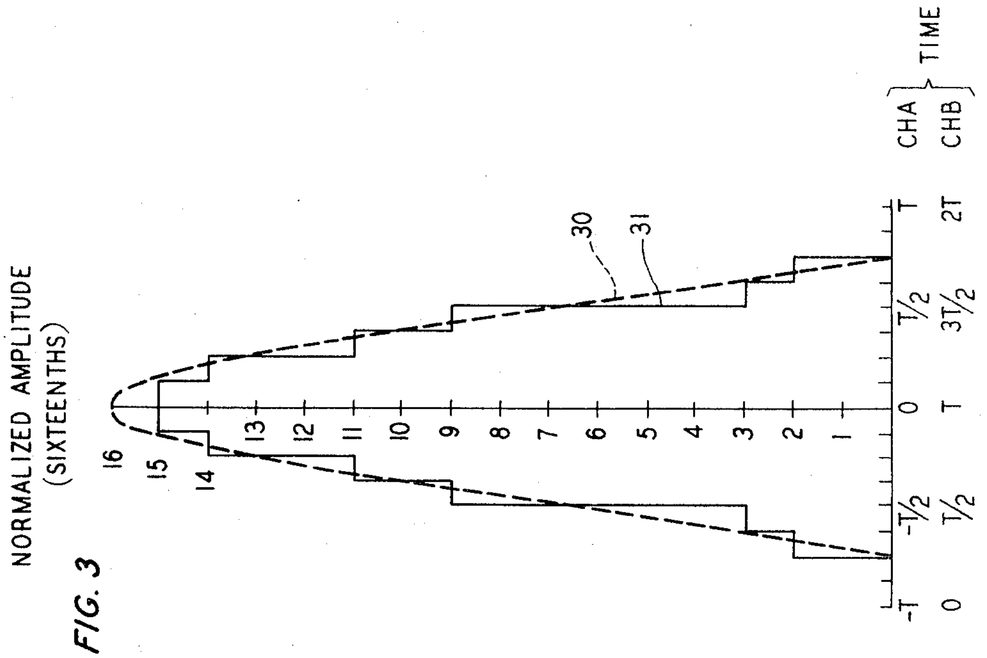
FIG. 3 is a waveform diagram showing a quantized modified raised-cosine weighting function useful in the practice of this invention.

A weighting function advantageously employed in this invention appears as curve 31 in FIG. 3. Solid curve 31 is a quantized approximation of the modified raised-cosine smooth curve outlined as broken line 30. As shown in FIG. 3, the sampled amplitudes of the weighting function are resolved into 16 levels and each particular sample is present for the duration of one of the 16 subintervals defined by the control states. Curve 31 is normalized relative to the peak amplitude that smooth curve 30 yields. It will be understood that curve 31 represents the weighting function for channel A when the upper time scale is used; the weighting function for channel B has the same shape as curve 31, but is displaced in time by T seconds. This time relationship is indicated in FIG. 3 by assigning the lower time scale to channel B.

Table I summarizes the operation of the envelope modulator employing the weighting functions of FIG. 3. The columns labeled "Assigned Weights" contain the weights assigned to the two input channels during successive control states in a 2T second dibit pair interval. These weights are obtained from curve 31 by choosing simultaneous points in time on the two different time scales in FIG. 3. The columns labeled "Output Combinations" contain the polarized sums of the two weights as determined by the input combination indicated at the top of the column. In obtaining the polarized sum of weights, a weight is assigned negative polarity when its channel has a logical 0 input and a positive polarity for a logical 1 input. It will be understood that although the generation of Table I requires the assumption that the two input signals are invariant during the 2T second interval, this condition never occurs in the present embodiment. However, this assumption has simplified the construction of Table I which can now be used to determine the instantaneous output condition during a particular control state, given the indicated instantaneous input combination. Thus, in the control state represented by the third row of Table I, if the instantaneous input coimbination is [0, 1] (channel A=0, channel B=1), the instantaneous output is the relative amplitude 9 obtained by adding the negative of the weight of channel A to the weight of channel B. This value appears in the third row of column four. Now, if the input combination in the same control state suddenly changes to [1, 0], the output changes to relative amplitude –9 derived by adding the weight for channel A to the negative of the weight for channel B. This value appears in the third row of the fifth column. The remaining entries in the table are obtained in a similar fashion.

TABLE I

| ASSIGNED WEIGHTS | | OUTPUT COMBINATIONS | | | |
|---|---|---|---|---|---|
| CH. A | CH. B | CH. A=0 CH. B=0 | CH. A=0 CH. B=1 | CH. A=1 CH. B=0 | CH. A=1 CH. B=1 |
| 0 | 15 | –15 | 15 | –15 | 15 |
| 0 | 14 | –14 | 14 | –14 | 14 |
| 2 | 11 | –13 | 9 | – 9 | 13 |
| 3 | 9 | –12 | 6 | – 6 | 12 |
| 9 | 3 | –12 | – 6 | 6 | 12 |
| 11 | 2 | –13 | – 9 | 9 | 13 |
| 14 | 0 | –14 | –14 | 14 | 14 |
| 15 | 0 | –15 | –15 | 15 | 15 |
| 15 | 0 | –15 | –15 | 15 | 15 |
| 14 | 0 | –14 | –14 | 14 | 14 |
| 11 | 2 | –13 | – 9 | 9 | 13 |
| 9 | 3 | –12 | – 6 | 6 | 12 |
| 3 | 9 | –12 | 6 | – 6 | 12 |
| 2 | 11 | –13 | 9 | – 9 | 13 |
| 0 | 14 | –14 | 14 | –14 | 14 |
| 0 | 15 | –15 | 15 | –15 | 15 |

Table I shows that, during any subinterval of the 2T second period of the weighting functions, there is a unique output for each combination of inputs. Since, the subintervals of the period of the weighting function correspond to successive control states, there is necessarily a correlation between the sequence of weights and the sequence of control states. In the design of logic network 21, each row of Table I is assigned a control state comprising one of the 16 states of the outputs of logic control 26 on leads 22A through 22D. An appropriate correspondence between the weights assigned to the respective input channels and the 16 control states in each complete sequence is depicted in Table II.

TABLE II

| CONTROL STATE | | | | WEIGHT | |
|---|---|---|---|---|---|
| M | N | P | Q | CH. A | CH. B |
| 0 | 1 | 0 | 0 | 0 | 15 |
| 0 | 1 | 0 | 1 | 0 | 14 |
| 0 | 1 | 1 | 0 | 2 | 11 |
| 0 | 1 | 1 | 1 | 3 | 9 |
| 1 | 0 | 0 | 0 | 9 | 3 |
| 1 | 0 | 0 | 1 | 11 | 2 |
| 1 | 0 | 1 | 0 | 14 | 0 |
| 1 | 0 | 1 | 1 | 15 | 0 |
| 1 | 1 | 0 | 0 | 15 | 0 |
| 1 | 1 | 0 | 1 | 14 | 0 |
| 1 | 1 | 1 | 0 | 11 | 2 |
| 1 | 1 | 1 | 1 | 9 | 3 |
| 0 | 0 | 0 | 0 | 3 | 9 |
| 0 | 0 | 0 | 1 | 2 | 11 |
| 0 | 0 | 1 | 0 | 0 | 14 |
| 0 | 0 | 1 | 1 | 0 | 15 |

Table I indicates that the quantized output of the envelope modulator ranges between relative amplitudes −15 and 15 in decimal notation. This decimal range is readily translated into binary notation in five-bit one's complement form in which positive numbers are represented in the usual binary form with a 0 for the most significant bit. Negative numbers have the form of positive numbers of the same magnitude but with all bits complemented.

Table III is a reconstruction of Table I in which the control states of Table II have been substituted for the corresponding assigned weights and the one's complement representation replaces the decimal form of the output. The columns labeled "control states" contain the values of the signals M, N, P and Q corresponding to each of the control states and the columns labeled "output states" contain the instantaneous values of the signals V, W, X, Y and Z that result on output lines 23A through 23E of logic network 21 with the instantaneous values of the input signals appearing at the top of the column.

TABLE III

| CONTROL STATES | | | | V W X Y Z OUTPUT STATES | | | |
|---|---|---|---|---|---|---|---|
| M | N | P | Q | CH. A=0 CH. B=0 | CH. A=0 CH. B=1 | CH. A= CH. B=0 | CH. A=1 CH. B=1 |
| 0 | 1 | 0 | 0 | 10000 | 01111 | 10000 | 01111 |
| 0 | 1 | 0 | 1 | 10001 | 01110 | 10001 | 01110 |
| 0 | 1 | 1 | 0 | 10010 | 01001 | 10110 | 01101 |
| 0 | 1 | 1 | 1 | 10011 | 00110 | 11001 | 01100 |
| 1 | 0 | 0 | 0 | 10011 | 11001 | 00110 | 01100 |
| 1 | 0 | 0 | 1 | 10010 | 10110 | 01001 | 01101 |
| 1 | 0 | 1 | 0 | 10001 | 10001 | 01110 | 01110 |
| 1 | 0 | 1 | 1 | 10000 | 10000 | 01111 | 01111 |
| 1 | 1 | 0 | 0 | 10000 | 10000 | 01111 | 01111 |
| 1 | 1 | 0 | 1 | 10001 | 10001 | 01110 | 01110 |
| 1 | 1 | 1 | 0 | 10010 | 10110 | 01001 | 01101 |
| 1 | 1 | 1 | 1 | 10011 | 11001 | 00110 | 01100 |
| 0 | 0 | 0 | 0 | 10011 | 00110 | 11001 | 01100 |
| 0 | 0 | 0 | 1 | 10010 | 01001 | 10110 | 01101 |
| 0 | 0 | 1 | 0 | 10001 | 01110 | 10001 | 01110 |
| 0 | 0 | 1 | 1 | 10000 | 01111 | 10000 | 01111 |

Table III completely represents the operation of logic network 21 and can, therefore, be used as a truth table to obtain the Boolean equations for V, W, X, Y and Z in terms of the inputs, A and B, and the values of M, N, P and Q. Methods for obtaining Boolean equations are common to the art and can be found described in detail in elementary textbooks on logic design.

Figure 4:
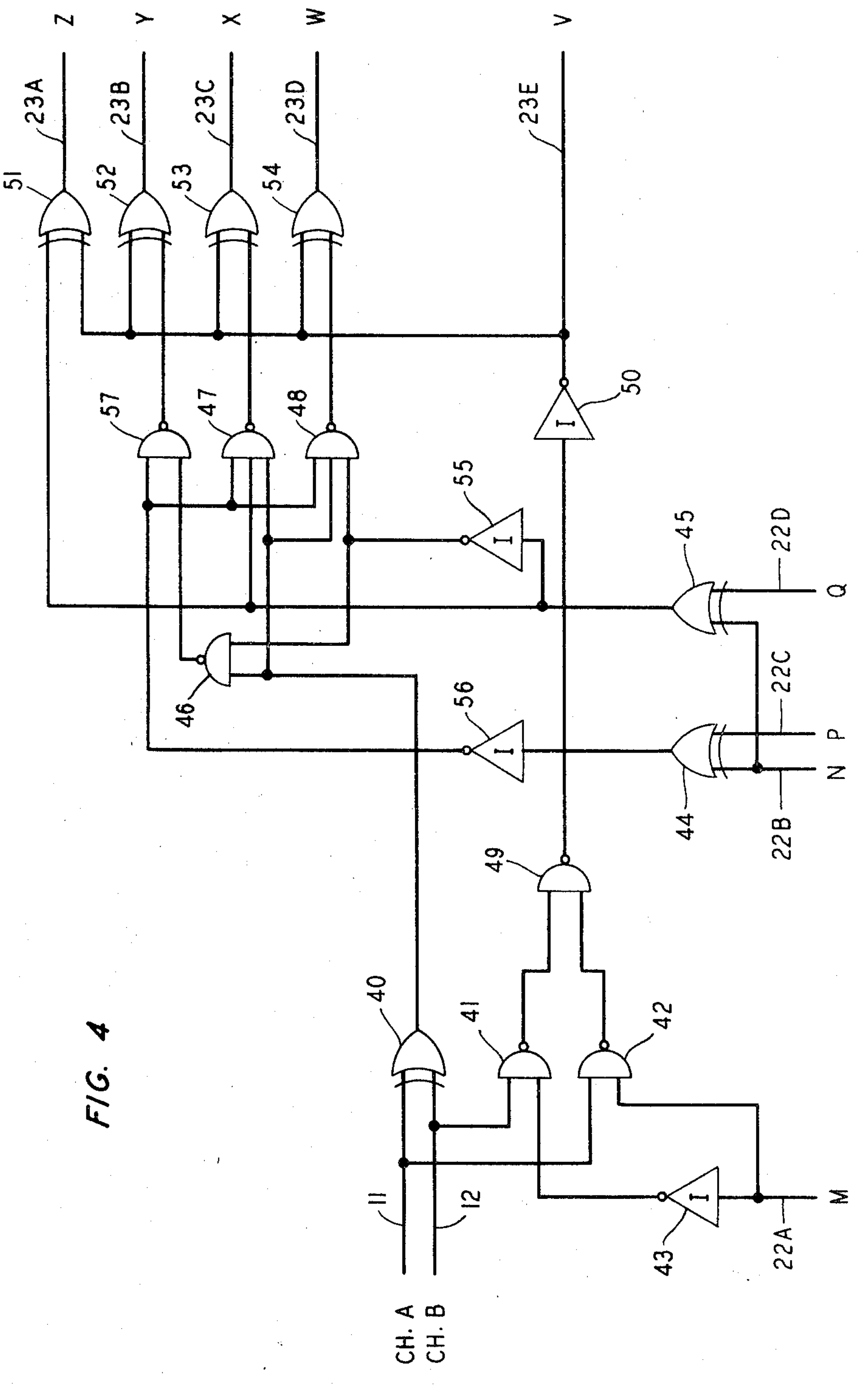
FIG. 4 is a schematic diagram of a logic network useful in the practice of this invention.

Prior to the presentation of the Boolean equations, mention should be made of the logic circuits which are to be used to realize these equations. The digital network is constructed of inverters, NAND gates and EXCLUSIVE-OR gates. An inverter performs the Boolean operation of complementation represented by a bar over the variable complemented. Thus, if the input to an inverter is the variable $x$, its output is $\bar{x}$. A NAND gate performs a Boolean product followed by a complementation, producing $\overline{xy}$ if the variables $x$ and $y$ are inputs. An EXCLUSIVE-OR gate performs a Boolean comparison and complementation, that is, its output is a logical 1 when the two inputs are not alike. The EXCLUSIVE-OR operation is commonly represented by the symbol $\oplus$ ($x \oplus y$ is read "$x$ EXCLUSIVE-OR $y$"). Now, the Boolean expressions for Z, Y, X, W and V can be derived from Table III. These expressions are given, respectively, in equations (1), (2), (3), (4) and (5), where they have been manipulated into a form from which the logic diagram of FIG. 4 is easily obtained.

$$Z = (N \oplus Q) \oplus V \quad (1)$$

$$Y = \overline{[(\overline{N \oplus Q})\ (A \oplus B)][(\overline{N \oplus P})]} \oplus V \quad (2)$$

$$X = \overline{[(N \oplus Q)(A \oplus B)(\overline{N \oplus P})]} \oplus V \quad (3)$$

$$W = \overline{[(\overline{N \oplus Q})(A \oplus B)(\overline{N \oplus P})]} \oplus V \quad (4)$$

$$V = (\overline{M \cdot A})(\overline{\overline{M} \cdot B}) \quad (5)$$

FIG. 4 is a logic diagram depicting the internal functions of logic network 21. The input signals, channels A and B, appear on lines 11 and 12 respectively; the control signals M, N, P and Q appear on lines 22A through 22D respectively; and the resulting parallel bit streams containing elements Z, Y, X, W and V result on lines 23A through 23E, respectively.

The channel A signal is applied to X-OR (EXCLUSIVE-OR) gate 40 and NAND gate 42 and the channel B signal, to X-OR gate 40 and NAND gate 41. Signal M is applied directly to NAND gate 42 and through inverter 43 to NAND gate 41, signal N goes to X-OR gates 44 and 45 and signals P and Q to X-OR gates 44 and 45, respectively. The output of X-OR gate 40 goes to NAND gates 46, 47 and 48. NAND gate 49 operates on the outputs of NAND gates 41 and 42 to produce signal V on line 23E after a complementation by inverter 50; the signal V is applied to X-OR gates 51 through 54. Through inverter 56, the output of X-OR gate 44 goes to NAND gates 47, 48 and 57. The output of X-OR gate 45 goes directly to X-OR gate 51 and NAND gate 47 and through inverter 55 to NAND gates 46 and 48. NAND gate 57 receives the output of NAND gate 46. Signal Z results at the output of X-OR gate 51. X-OR gate 52 receives the output of NAND gate 57 and produces signal Y; X-OR gate 53 receives the output of NAND gate 47 and produces signal X; and X-OR gate 54 receives the output of NAND gate 48 and produces signal W.

The logic diagram of FIG. 4 is readily obtained from equations (1) through (5). As an example of this technique, it will be shown how equation (2) is realized in FIG. 4. The operation $\overline{N \oplus Q}$ is performed by the combination of X-OR gate 45 and inverter 55. X-OR gate 40 produces $A \oplus B$ in an obvious manner. When the output of inverter 55 and X-OR gate 40 is applied to NAND gate 46, the expression $\overline{(\overline{N \oplus Q})(A \oplus B)}$ is implemented. The combination of X-OR gate 44 and inverter 56 performs the operation $\overline{N \oplus P}$. The results of this operation, when applied to NAND gate 57 along with a signal representing $\overline{(\overline{N \oplus Q})(A \oplus B)}$, yield a further signal representing $$\overline{[\overline{(\overline{N \oplus Q})(A \oplus B)}][(\overline{N \oplus P})]}$$

at the output of NAND gate 57. Clearly, the application of the output of NAND gate 57 and the signal V to X-OR gate 52 implements equation (2). The rest of the logic circuit of FIG. 4 implements the remaining equations (1), (3), (4) and (5) in a similar fashion.

Figure 5:
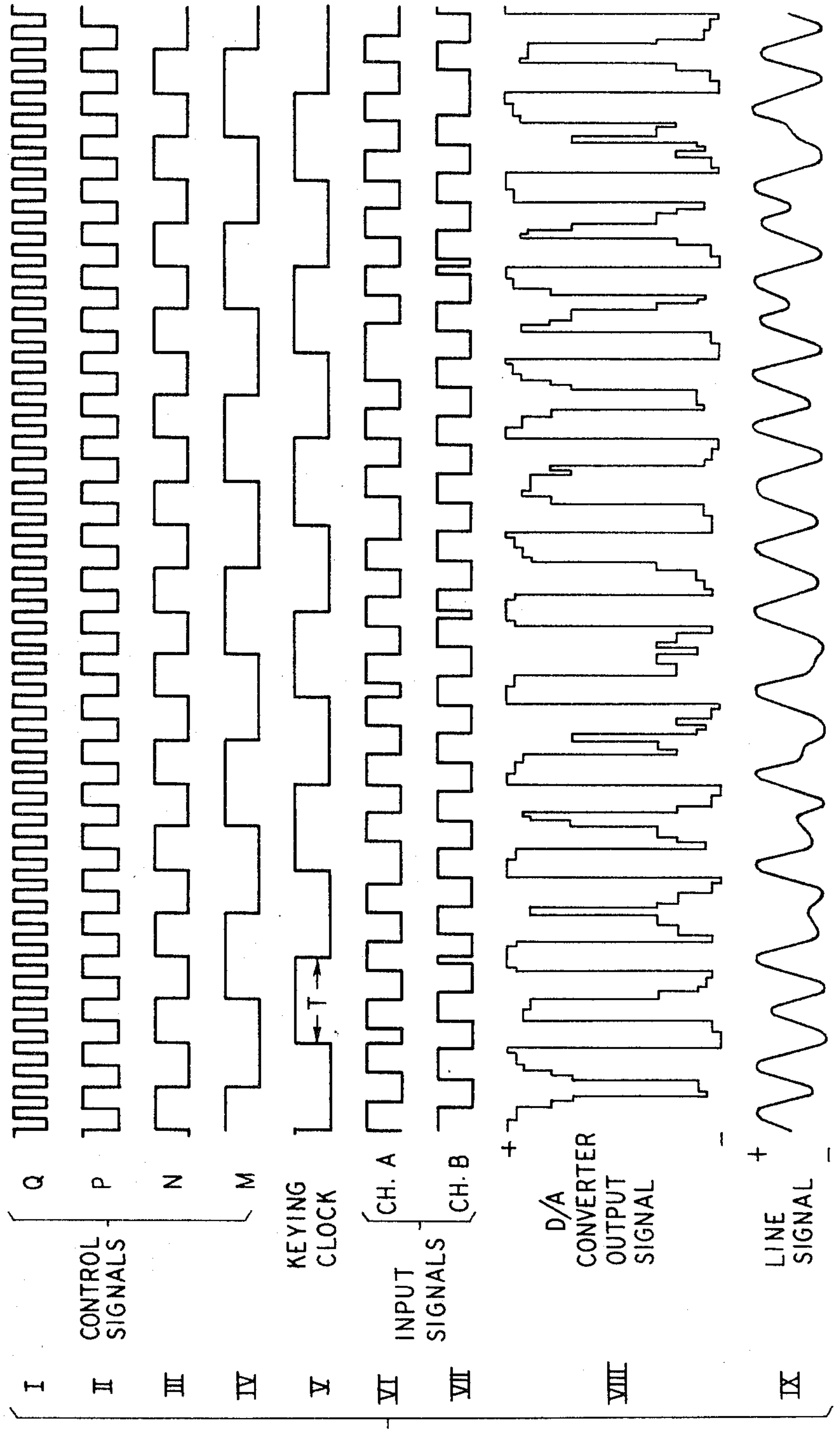
FIG. 5 is a diagram of the waveforms encountered in various parts of the envelope modulator.

FIG. 5 illustrates typical waveforms that are obtained with the illustrative embodiment of the invention. The waveforms IV, III, II and I represent control signals M, N, P and Q, respectively. The keying clock signal is shown in waveform V for reference purposes; in the illustrative logic network 21 of FIG. 2, the clock signal leads signal M by 90°. Waveforms VI and VII represent phase-modulated signals available on channels A and B when the bit sequence 00000101111110100001011100 is encoded according to the teaching of the cited Baker patent. It will be observed that channel A is keyed on the positive-going transitions of the keying clock signal and channel B, on the negative-going transitions. Logical operations as previously outlined produce a plurality of bit streams which, after digital-to-analog conversion, yields waveform VIII. Instantaneous quantized levels in waveform VIII correspond to the combination of a particular control state, as determined by the condition of the signals M, N, P and Q from logic control 26 in FIG. 2, and the instant value of input signals A and B. Thus, waveform VIII can change value in the middle of a control state if one or both of the input signals changes. Finally, low-pass filtering, as supplied by block 19 in FIG. 1, yields the smooth line signal shown as waveform IX.

While a specific embodiment of the invention has been described above, it will be apparent to one skilled in the art that numerous modifications within the scope and spirit of the following claims are possible. Among these modifications are:

a. operation with more than two synchronous binary inputs, b. operation with a plurality of synchronous binary inputs which are not phase-shift keyed, c. operation with a single binary input as a wave-shaper, d. substitution of a read-only memory for logic network 21, e. derivation of the logic control signals from a single master clock operating at 8/T pulses per second through frequency division, and f. quantization of a weighting function other than the modified raised-cosine function diagramed in FIG. 3.

What is claimed is:

1. An envelope modulator for binary data signals comprising a multichannel source of synchronous binary input signals;

a source of control signals defining a repetitive sequence of control states; and means jointly responsive to said input and control signals for producing an output signal whose instantaneous value equals the algebraic sum of products of the sense of each input signal with the particular weight assigned to its channel during each control state, the sequence of such weights, repeating in correspondence to the sequence of control states, defining the desired envelope shaping for the individual channel.

2. The envelope modulator of claim 1 in which the said producing means comprises logic means jointly responsive to said input and control signals for producing a plurality of bit streams which collectively encode said output signal, and digital-to-analog conversion means for generating said output signal as a weighted summation of the bit streams from said logic means.

3. The envelope modulator of claim 2 in which said multichannel source provides two phase-shift keyed signals A and B, whose phase changes occur during alternate synchronous intervals, said control-signal source supplying four binary signals M, N, P and Q respectively at once, twice, four and eight times the synchronous rate and in which the operation of said logic means is defined by the following Boolean equations:

$$Z = N \oplus Q \oplus V \quad (1)$$

$$Y = \overline{\overline{(\overline{N \oplus Q})(A \oplus B)}(\overline{N \oplus P})} \oplus V \quad (2)$$

$$X = \overline{(N \oplus Q)(A \oplus B)(\overline{N \oplus P})} \oplus V \quad (3)$$

$$W = \overline{(\overline{N \oplus Q})(A \oplus B)(\overline{N \oplus P})} \oplus V \quad (4)$$

$$V = \overline{(M \cdot A)}(\overline{\overline{M} \cdot B}) \quad (5)$$

where signals V, W, X, Y and Z define the bit streams from said logic means.

4. In combination with a phase-modulated transmission system for digital data differentially encoded in groups of equal numbers of data bits as discrete phase changes occurring between successive synchronous signaling intervals of a squared-up carrier wave, carrier-wave bursts of substantially constant phase corresponding to successive signaling intervals being distributed in rotation among as many signaling channels as there are data bits in each code group, a digital envelope modulator comprising a control signal source providing a plurality of discrete control states during each data signaling interval, logic means jointly responsive to the binary states of each of said signaling channels and to said plurality of control states for combining the carrier waves on all said channels with an envelope shaping programmed for each channel as a set of weights equal in number to said plurality of control states.

5. The combination set forth in claim 4 in which said logic means forms as an output a plurality of binarily weighted bit streams encoding a composite phase-modulated carrier wave signal with a superimposed envelope shaping.

6. The combination set forth in claim 4 in which said logic means produces as an output a plurality of binarily weighted bit streams whose analog value corresponds to the algebraic summation of the products of the envelope-shaping weights assigned to each signaling channel and the instantaneous polarities of the channel signals taken during each of said control signal states.

7. A waveshaper for binary data comprising a control source synchronized with said binary data for providing a sequence of control-signal states repeated during each binary signaling interval; and means jointly responsive to said binary data and said control-signal states for producing a shaped output signal whose instantaneous value is the product of the instantaneous sense of the binary data and the particular weight assigned thereto during each control-signal state, a set of such weights being preassigned to the sequence of control-signal states to define a desired envelope shaping function.

8. The waveshaper of claim 7 in which said output-signal producing means comprises logic means for producing a plurality of bit streams collectively encoding said output signal, and digital-to-analog conversion means for combining the elements of said bit streams in accordance with a binary weighting into a single output signal.

* * * * *